United States Patent
Seki et al.

(10) Patent No.: US 10,891,912 B2
(45) Date of Patent: Jan. 12, 2021

(54) CONTROL DEVICE, ELECTRONIC DEVICE, AND CONTROL METHOD

(71) Applicant: SHARP KABUSHIKI KAISHA, Sakai (JP)

(72) Inventors: Fumitaka Seki, Sakai (JP); Kenji Maeda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/431,246

(22) Filed: Jun. 4, 2019

(65) Prior Publication Data

US 2019/0378469 A1 Dec. 12, 2019

(30) Foreign Application Priority Data

Jun. 7, 2018 (JP) .................................. 2018-109725

(51) Int. Cl.
*G09G 3/36* (2006.01)
*G02F 1/13357* (2006.01)
*G02F 1/133* (2006.01)

(52) U.S. Cl.
CPC ........ *G09G 3/3648* (2013.01); *G02F 1/13306* (2013.01); *G02F 1/133603* (2013.01)

(58) Field of Classification Search
CPC .......... G02F 1/13306; G02F 1/133603; G09G 3/3406; G09G 3/342; G09G 3/3607; G09G 3/3648; G09G 2320/0242; G09G 2320/0252; G09G 2320/0257
See application file for complete search history.

(56) References Cited

U.S. PATENT DOCUMENTS

| 2006/0208998 A1* | 9/2006 | Okishiro | G09G 3/3648 345/102 |
| 2007/0018557 A1* | 1/2007 | Fujiwara | G02F 1/133603 313/483 |
| 2009/0303161 A1* | 12/2009 | Messmer | G09G 3/2007 345/55 |

(Continued)

FOREIGN PATENT DOCUMENTS

JP 2008-135459 A 6/2008

OTHER PUBLICATIONS

Co-pending letter referencing co-pending U.S. Appl. No. 16/394,637.
Office Action for U.S. Appl. No. 16/394,637 dated Feb. 20, 2020.

*Primary Examiner* — Mihir K Rayan
(74) *Attorney, Agent, or Firm* — ScienBiziP, P.C.

(57) ABSTRACT

The present invention relates to a light emitting device and achieves either desirable color reproduction or improved image quality of a moving image according to the usage of an electronic device. The electronic device includes a first light emitting device and a second light emitting device having color reproducibility lower than that of the first light emitting device and having a response speed faster than that of the first light emitting device, and a control device includes a light emission control section configured to control light emission of the first light emitting device and light emission of the second light emitting device according to a usage of the electronic device such that a relation between luminance of the first light emitting device and luminance of the second light emitting device satisfies a predetermined condition.

6 Claims, 8 Drawing Sheets

(56) References Cited

U.S. PATENT DOCUMENTS

| | | | | |
|---|---|---|---|---|
| 2012/0105515 A1* | 5/2012 | Iwasaki | ................ | G09G 3/3406 |
| | | | | 345/691 |
| 2019/0180699 A1* | 6/2019 | Seki | ..................... | G09G 3/3611 |
| 2019/0333453 A1* | 10/2019 | Seki | ......................... | G09G 3/36 |

* cited by examiner

CONTROL DEVICE, ELECTRONIC DEVICE, AND CONTROL METHOD

This Nonprovisional application claims priority under 35 U.S.C. § 119 on Patent Application No. 2018-109725 filed in Japan on Jun. 7, 2018, the entire contents of which is hereby incorporated by reference.

TECHNICAL FIELD

The present invention relates to a control device, an electronic device, and a control method.

BACKGROUND ART

Conventionally, research and development of backlights for liquid crystal display devices using light emitting diodes have been advanced. For example, Patent Literature 1 discloses a backlight constituted by a LED light source in which single-chip white light emitting diodes (LEDs) and multi-chip full-color LEDs are used in combination and are arranged in a predetermined pattern on an X-Y plane. Here, the single-chip white LEDs are light emitting diodes capable of achieving a high luminance with low power consumption, and the multi-chip full-color LEDs are light emitting diodes capable of achieving high color rendering and high color reproducibility.

CITATION LIST

Patent Literature

[Patent Literature 1]
Japanese Patent Application Publication Tokukai No. 2008-135459 (Publication date: Jun. 12, 2008)

SUMMARY OF INVENTION

Technical Problem

Patent Literature 1 discloses a technique for achieving high color rendering and high color reproducibility and achieving a high luminance with low power consumption by appropriately combining the above-described white LEDs and full-color LEDs. However, Patent Literature 1 neither describes nor suggests the compatibility between (i) the achievement of high color rendering and high color reproducibility or the achievement of a high luminance with low power consumption and (ii) the achievement of an excellent response speed. Therefore, the backlight disclosed in Patent Literature 1 had to abandon the achievement of an excellent response speed.

An aspect of the present invention has been attained in view of the above problem, and it is an object of the aspect of the present invention to provide a light emitting device, such as a backlight, capable of not only obtaining an excellent response speed, but also achieving high color reproducibility and other effects.

Solution to Problem

In order to solve the above problem, a control device in accordance with an aspect of the present invention is a control device for controlling an electronic device, the electronic device including: at least one first light emitting device; and at least one second light emitting device having color reproducibility lower than that of the first light emitting device and having a response speed faster than that of the first light emitting device, the control device including: a light emission control section configured to control light emission of the first light emitting device and light emission of the second light emitting device according to a usage of the electronic device such that a relation between luminance of the first light emitting device and luminance of the second light emitting device satisfies a predetermined condition.

In order to solve the above problem, an electronic device in accordance with an aspect of the present invention is an electronic device including: at least one first light emitting device; at least one second light emitting device; and at least one control device, the second light emitting device having color reproducibility lower than that of the first light emitting device and having a response speed faster than that of the first light emitting device, the control device carrying out light emission control processing of controlling light emission of the first light emitting device and light emission of the second light emitting device according to a usage of the electronic device such that a relation between luminance of the first light emitting device and luminance of the second light emitting device satisfies a predetermined condition.

In order to solve the above problem, a control method performed by a control device in accordance with an aspect of the present invention is a control method by which a control device controls an electronic device, the electronic device including: at least one first light emitting device; and at least one second light emitting device having color reproducibility lower than that of the first light emitting device and having a response speed faster than that of the first light emitting device, the control method including: a light emission control step of controlling light emission of the first light emitting device and light emission of the second light emitting device according to a usage of the electronic device such that a relation between luminance of the first light emitting device and luminance of the second light emitting device satisfies a predetermined condition.

Advantageous Effects of Invention

According to an aspect of the present invention, it is possible for the first and second light emitting devices as a whole to achieve either an image with more vivid colors than actual colors of a real-world object (an image that realizes desirable color reproduction) or improved image quality of a moving image according to the usage of the electronic device.

DESCRIPTION OF EMBODIMENTS

Embodiment 1

Figure 1:
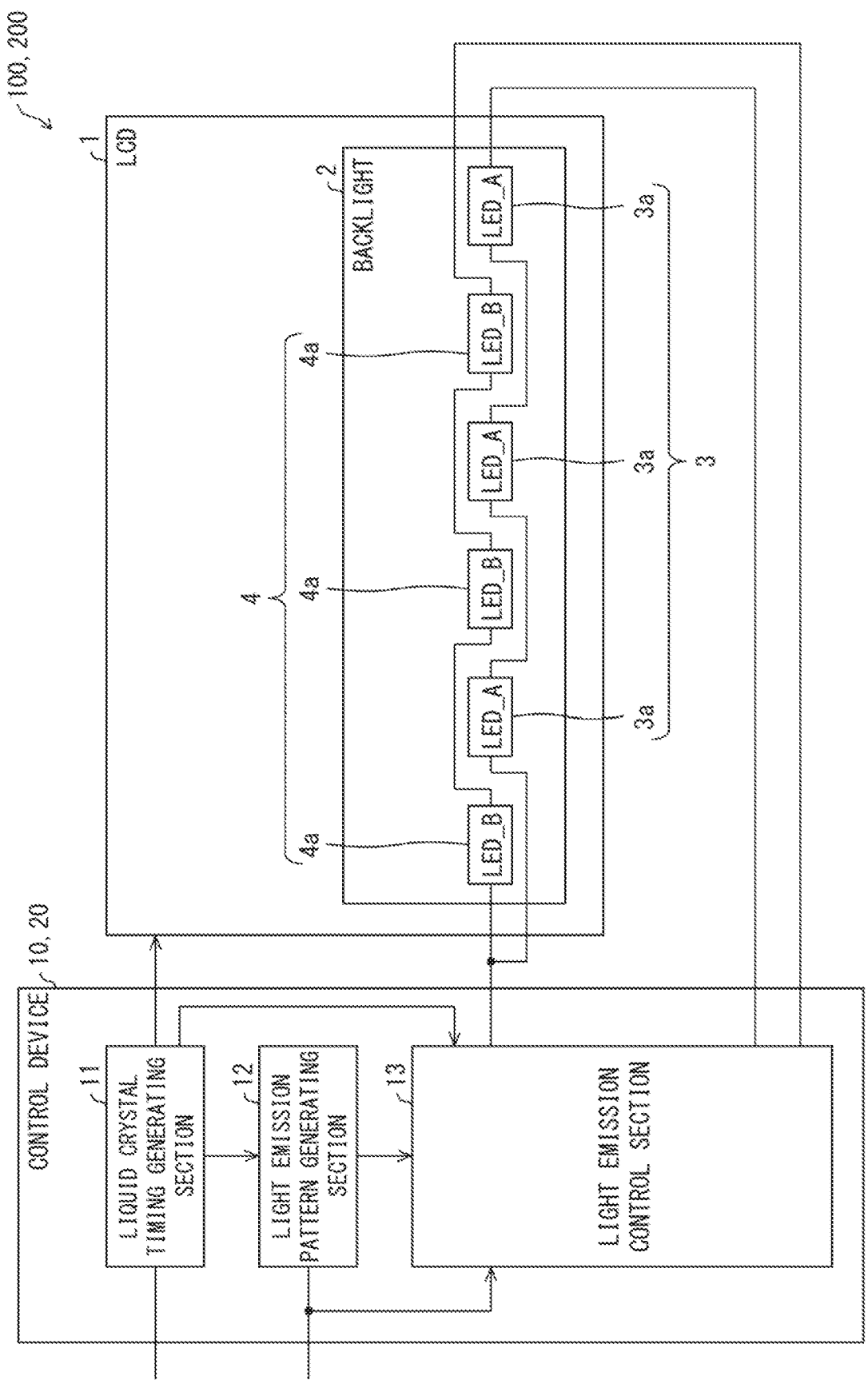
FIG. 1 is a block diagram illustrating a functional configuration of a control device in accordance with Embodiments 1 and 2 of the present invention.

For convenience of description, members having functions identical to those of members described for specific items are given the same reference signs, and descriptions of such members are omitted. In this regard, the same applies to Embodiments 2 and 3. Further, in Embodiment 1 and the subsequent embodiments, a display device (hereinafter, exemplified by a liquid crystal display (LCD)), a control device, and other devices included in an electronic device in accordance with an aspect of the present invention may each be a single device or a plurality of devices.

Further, the electronic device to which the present invention is applied can be exemplified by not only a smartphone presented below, but also a foldable mobile phone, a wearable terminal, a small-sized gaming machine, a tablet terminal, a head-mounted display (HMD), and the like. In other words, the electronic device to which the present invention is applied may be any device that contains two light emitting devices which are each constituted by a light emitting element such as an LED and have different color reproducibilities and different response speeds.

In general, "color reproducibility" refers to the degree of reproduction of actual colors of a certain object by color matching. Here, "achievement of high color reproducibility" and "improvement of color reproducibility" each encompass the following two meanings: (i) color reproduction that ensures colors true to actual colors of a real-world object (i.e., "realization of corresponding color reproduction") and (ii) color reproduction that ensures more vivid colors than actual colors of a real-world object (i.e., "realization of desirable color reproduction").

Hereinafter, in the present specification, "color reproducibility" means the degree of vividness of colors of an image as compared with actual colors of a certain object. Further, in the present specification, "achievement of high color reproducibility" and "improvement of color reproducibility" each mean color reproduction that ensures more vivid colors than actual colors of a real-world object, i.e. "realization of desirable color reproduction".

Configuration of Smartphone

A smartphone 100 (electronic device) is a multi-function mobile phone having functions of a personal computer, a personal digital assistant (PDA), and the like. A virtual reality (VR) application software is installed on the smartphone 100, so that an image can be displayed as a VR on a display screen. As illustrated in the FIG. 1, the smartphone 100 includes an LCD 1 and a control device 10. In these regards, the same applies to smartphones 200 and 300 described later.

In Embodiment 1 and the subsequent embodiments, the application software of VRs will be described as an example of a display mode in which a response speed of a backlight 2 (described later) is emphasized. However, this is not the only application for the present invention. For example, the present invention can be applied to a display mode in which a blurred image may be produced, such as display at an ultrahigh refresh rate.

(LCD)

The LCD 1 has a liquid crystal display panel (not illustrated) and a backlight 2. The liquid crystal display panel is a display panel in which a liquid crystal layer is disposed between substrates. The liquid crystal display panel receives a control signal (image data) from a liquid crystal timing generating section 11 (described later) to display an image. The backlight 2 is provided on the back surface of the liquid crystal display panel and irradiates the liquid crystal display panel with light.

A part (or whole) of the backlight 2 is composed of BL_A 3 (first light emitting device) and BL_B 4 (second light emitting device). The BL_A 3 is configured to include three light emitting elements, LEDs_A 3a (first light emitting elements), which are connected in series. The BL_B 4 is configured to include three light emitting diodes, LEDs_B 4a (second light emitting elements), which are connected in series. The LEDs_B 4a differ from the LEDs_A 3a.

For convenience of explanation, FIG. 1 illustrates a case in which three LEDs_A 3a and three LEDs_B 4a are arranged in the backlight 2. However, actually, a large number of LEDs_A 3a and a large number of LEDs_B 4a are arranged in the backlight. The same applies to LEDs_A 3a and LEDs_B 4a in accordance with Embodiment 3.

The LEDs_A 3a each have higher color reproducibility than the LEDs_B 4a, but have a slower response speed than the LEDs_B 4a. That is, the BL_A 3 has higher color reproducibility than the BL_B 4, but has a slower response speed than the BL_B 4. Conversely, the LEDs_B 4a each have lower color reproducibility than the LEDs_A 3a, but have a faster response speed than the LEDs_A 3a. That is, the BL_B 4 has lower color reproducibility than the BL_A 3, but has a faster response speed than the BL_A 3.

In a case where the LCD 1 is used in a color reproducibility emphasizing mode, for example, when the smartphone 100 is in normal use, the LEDs_A 3a and the LEDs_B 4a are controlled to emit light such that the luminance of the BL_A 3 is higher than the luminance of the BL_B 4 (detailed later). In a case where the LCD 1 is used in a response speed emphasizing mode, for example, when the smartphone 100 uses the VR application software, the LED_A 3a and the LED_B 4a are controlled to emit light such that the luminance of the BL_A 3 is lower than the luminance of the BL_B 4 (detailed later).

In Embodiment 1 and the subsequent embodiments, the backlight 2 (i.e., the smartphone 100) is configured such that the LEDs_A 3a and the LEDs_B 4a are arranged so as to be adjacent to each other. By arranging the LEDs_A 3a and the LED_B 4a in this manner, the entire surface of the display screen of the LCD 1 can be substantially uniformly lit, for example, even when only either one of the LEDs_A 3a and the LEDs_B 4*a* are caused to light. That is, it is possible to effectively prevent lighting unevenness of the display screen of the LCD 1.

The arrangement of the LEDs_A 3*a* and the LEDs_B 4*a* is not limited to the above arrangement, and may be any arrangement. The LEDs_A 3*a* may have lower color reproducibility and faster response speed than the LEDs_B 4*a*. That is, the BL_A 3 may have lower color reproducibility and a higher response speed than BL_B 4.

Further, each of the BL_A 3 and the BL_B 4 is not necessarily constituted by a plurality of light emitting diodes, and may be constituted by other light emitting elements. Further, two or more columns of BLs_A 3 and two or more columns of BLs_B 4 may be arranged inn the backlight 2. In these respects, the same applies to Embodiments 2 and 3.

(Control Device)

The control device 10 is, for example, a central processing unit (CPU), and executes programs stored in a storage device (not illustrated) or the like built in the smartphone 100, thereby centrally controlling the operations of the respective devices of the smartphone 100. The control device 10 centrally controls a light emitting function of the backlight 2, and includes a liquid crystal timing generating section 11, a light emission pattern generating section 12, and a light emission control section 13.

The control device 10 does not necessarily have to be a CPU for centrally controlling the operations of the respective devices of the smartphone 100. For example, the control device 10 may be incorporated in the smartphone 100 independently of the CPU or may be mounted on an external information processing device provided outside the smartphone 100, as a device for centrally controlling the light emitting function of the backlight 2. In a case where the control device 10 is mounted on an external information processing device, a display screen lighting manner is controlled by transmitting and receiving information relating to a lighting manner of the display screen of the LCD 1 between the information processing device and the smartphone 100.

The liquid crystal timing generating section 11 obtains image data of an image to be displayed on the display screen of the LCD 1 and generates a control signal for driving the LCD 1, and then outputs the control signal to the LCD 1. The LCD 1 having obtained the control signal causes the image data related to the control signal to be displayed on the display screen. In addition, the liquid crystal timing generating section 11 generates a vertical synchronizing signal (VSYNC), an operating mode signal for the BL_A 3, and an operating mode signal for the BL_B 4, and outputs these operating mode signals to the light emission pattern generating section 12. The operating mode signals are also outputted to the light emission control section 13. The VSYNC is a vertical synchronizing signal for providing timing of the start of redrawing (scanning) of the display screen of the smartphone 100, as illustrated in FIG. 2.

In Embodiment 1, the "operating mode" in the term "operating mode signal" refers to the following two modes: (I) an operating mode when the smartphone 100 is in normal use (in the color reproducibility emphasizing mode), and (II) an operating mode when the VR application software is used (in the response speed emphasizing mode). Therefore, when the smartphone 100 is in normal use, the liquid crystal tinning generating section 11 generates an operating mode signal corresponding to the color reproducibility emphasizing mode. When the VR application software is used, the liquid crystal timing generating section. 11 generates the operating mode signal corresponding to the response speed emphasizing mode. In these regards, the same applies to Embodiments 2 and 3.

The light emission pattern generating section 12 generates a light emission pattern signal for controlling light emission of the BL_A 3 and a light emission pattern signal for controlling light emission of the BL_B 4, based on the VSYNC and the operating mode signal obtained from the liquid crystal timing generating section 11. The generated light emission pattern signals are outputted to the light emission control section 13.

Figure 2:
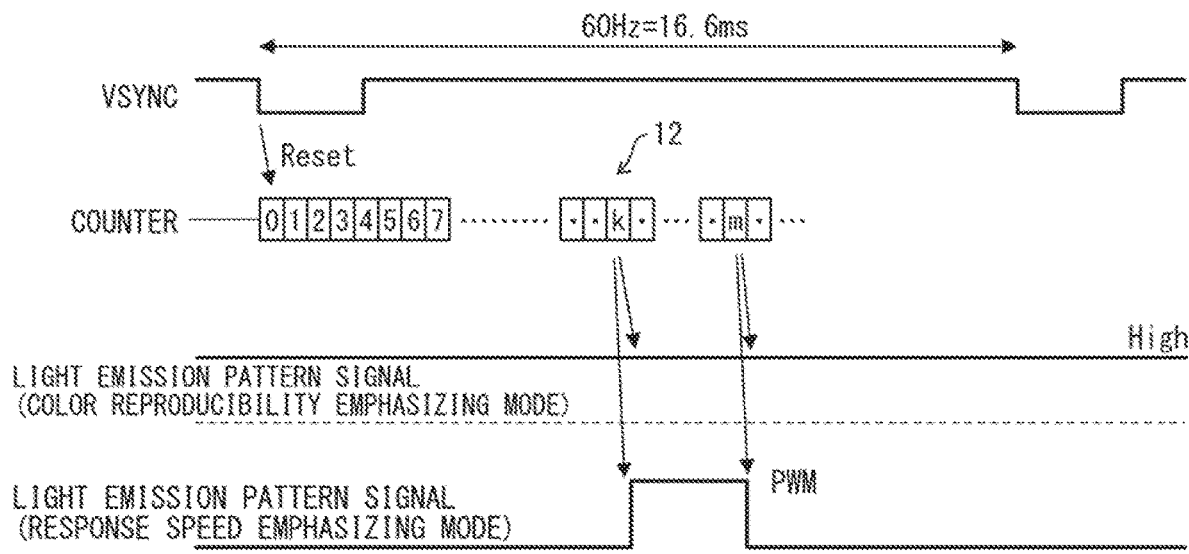
FIG. 2 is a diagram illustrating a relation between a liquid crystal driving signal VSYNC and an operating mode signal.

As illustrated in the FIG. 2, when obtaining the operating mode signal corresponding to the color reproducibility emphasizing mode, the light emission pattern generating section 12 generates a signal fixed at High as the signal light emission pattern signal. When obtaining the operating mode signal corresponding to the response speed emphasizing mode, the light emission pattern generating section 12 generates a pulse width modulation (PWM) signal as the light emission pattern signal. The "PWM" refers to a power control method in which a fixed period of an "ON" time and an "OFF" time in a pulse train is generated from input of a fixed voltage, and a duration of the "ON" time is changed.

In the light emission pattern generating section 12, as illustrated in FIG. 2, a counter ("COUNTER" in FIG. 2) is driven which is reset by obtaining the VSYNC from the liquid crystal timing generating section 11. By changing a voltage level according to a counter value specified by the counter, a waveform of the PWM is formed.

The liquid crystal timing generating section 11 and the light emission pattern generating section 12 are not necessarily provided in the control device 10. For example, the liquid crystal timing generating section 11 and the light emission pattern generating section 12 may be embedded in the smartphone 100 as a liquid crystal timing circuit and a light emission pattern generating circuit, respectively, independent of the control device 10. In this regard, the same applies to Embodiments 2 and 3.

The light emission control section 13 controls the light emission of the BL_A 3 and the light emission of the BL_B 4 such that a relation between a luminance X of the BL_A 3 and a luminance Y of the BL_B 4 satisfies a predetermined condition in accordance with usage of the smartphone 100 (light emission control process).

The "usage of the smartphone 100" refer to the following two usages: a case in which the smartphone 100 is in normal use (color reproducibility emphasizing mode); and a case in which the VR application software is used (response speed emphasizing mode), in Embodiment 1 and the subsequent embodiments.

The usage of the smartphone 100 is not limited to the two forms described above. For example, displaying a moving image with frequencies as high as about 150 Hz to 200 Hz on the display screen of the LCD 1 may be regarded as the response speed emphasizing mode, so that the response speed of the backlight 2 as a whole is emphasized. In other words, the usage of the smartphone 100 may be any two usages one of which emphasizes color reproducibility and another one of which emphasizes a response speed.

In Embodiment 1 and the subsequent embodiments, "satisfying the predetermined condition" refers to (i) a condition where a relation between the luminance X of the BL_A 3 and the luminance Y of the BL_B 4 when the smartphone 100 is in normal use (color reproducibility emphasizing mode) is $X = Y \times \alpha$ ($\alpha > 1$) and (ii) a condition where the relation between the luminance X of the BL_A 3 and the luminance Y of the BL_B 4 when the VR application software is used (response speed emphasizing mode) $X=Y\times\alpha$ ($\alpha<1$).

Assume here that the color reproducibility of the BL_A 3 is C1, the color reproducibility of the BL_B 4 is C2, and the color reproducibility of the whole backlight 2 is C. In this case, the color reproducibility C is, for example, calculated by the expression $C=(C1\times\alpha+C2\times1)/(1+\alpha)$. The above expression is merely an example expression, and any expression by which the color reproducibility C can be calculated with use of $\alpha$ can be used.

Assuming that the color reproducibility C2 is, for example, 60% relative to the color reproducibility C1 of 100%, a reference value of the color reproducibility C is set to $(100\%\times1+60\%\times1)/(1+1)=80\%$.

In the color reproducibility emphasizing mode, the color reproducibility C exceeds 80%. In contrast, in the response speed emphasizing mode, the color reproducibility C is below 80%.

From the above discussion, it is clear that making the relation between the luminance X and the luminance Y satisfy the predetermined condition in the color reproducibility emphasizing mode improves the color reproducibility of the whole backlight 2. Further, it is clear that making the relation between the luminance X and the luminance Y satisfy the predetermined condition in the response speed emphasizing mode improves the response speed while sacrificing the color reproducibility of the whole backlight 2 a little.

The "predetermined condition" is not limited to the two conditions described above. That is, both the condition where the luminance X of the BL_A 3 becomes higher than the luminance Y of the BL_B 4 and the condition where the luminance X of the BL_A 3 becomes lower than the luminance Y of the BL_B 4 are set according to the usage of the smartphone 100.

"Controlling the light emission of the BL_A 3 and the light emission of the BL_B 4" means, in part, that the light emission control section 13 adjusts the luminances X and Y based on the operating mode signal for the BL_A 3 and the operating mode signal for the BL_B 4, both of which signals have been obtained from the liquid crystal timing generating section 11. When the obtained operating mode signal for the BL_A 3 and the obtained operating mode signal for the BL_B 4 are each the operating mode signal corresponding the color reproducibility emphasizing mode, the light emission control section 13 controls the light emission of the BL_A 3 and the light emission of the BL_B 4 such that the relation between the luminance X and the luminance Y becomes $X=Y\times\alpha$ ($\alpha>1$), as illustrated in FIG. 3.

Figure 3:
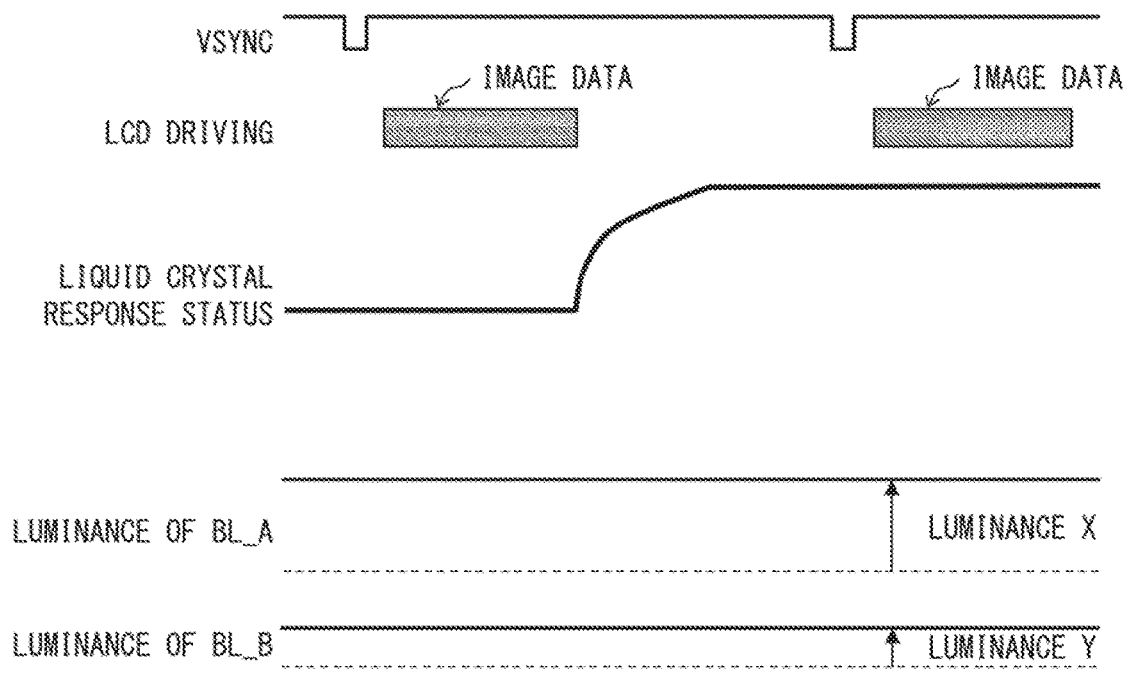
FIG. 3 is a diagram illustrating the luminance of BL_A and the luminance of BL_B in a color reproducibility emphasizing mode of a smartphone in accordance with Embodiment 1 of the present invention.
Figure 4:
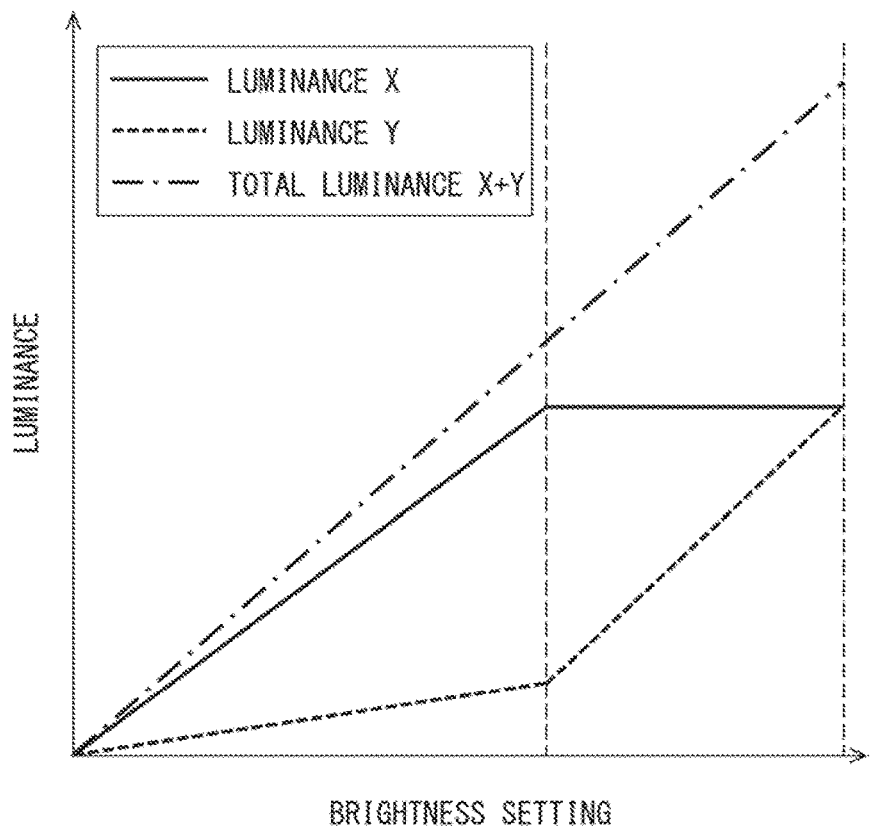
FIG. 4 is a diagram illustrating a relation between brightness setting of a display screen, the luminance of the BL_A, the luminance of the BL_B, and a total luminance in the color reproducibility emphasizing mode of the smartphone.

FIG. 4 illustrates a more detailed representation of the state illustrated in FIG. 3 in accordance with the actual specifications of the smartphone 100. In the smartphone 100, the luminance of the display screen of the LCD 1 is adjusted by changing the position of the brightness set g bar (not illustrated) of a user interface (UI) (The same applies to smartphones 200 and 300). In the case of the color reproducibility emphasizing mode, a relation between a luminance X+Y set by the brightness setting bar and luminances X and Y is $X=Y\times\alpha$ ($\alpha>1$) when the brightness setting bar is on a dark setting, as illustrated in FIG. 4. When the brightness setting bar is on a bright setting, X=maximum luminance of X and Y=(X+Y)−(maximum luminance of X).

Here, assume that the luminance X+Y set by the brightness setting bar is a total luminance X+Y. The total luminance X+Y is represented by the sum of the luminance X of the BL_A 3 and the luminance Y of the BL_B 4.

Figure 5:
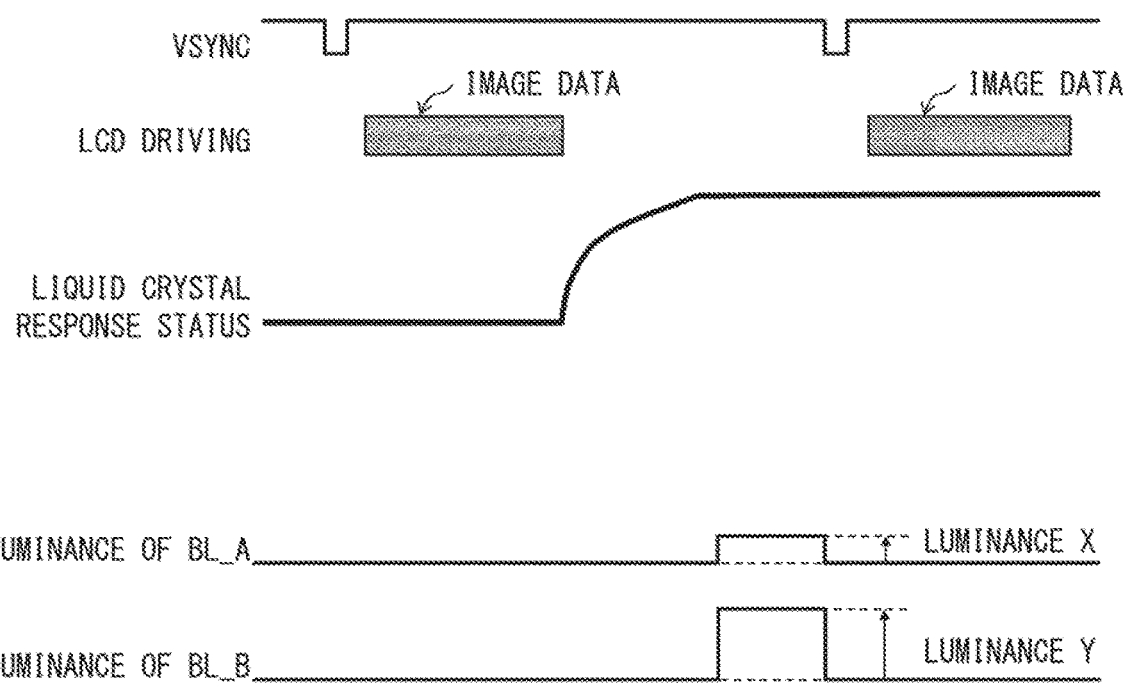
FIG. 5 is a diagram illustrating the luminance of the BL_A and the luminance of the BL_B for a response speed emphasizing mode in the smartphone.

Next, in a case where the obtained operating mode signal for the BL_A 3 and the obtained operating mode signal for the BL_B 4 are each the operating mode signal corresponding the response speed emphasizing mode, the light emission control section 13 controls the light emission of the BL_A 3 and the light emission of the BL_B 4 such that the relation between the luminance X and the luminance Y becomes $X=Y\times\alpha$($\alpha<1$), as illustrated in FIG. 5.

Figure 6:
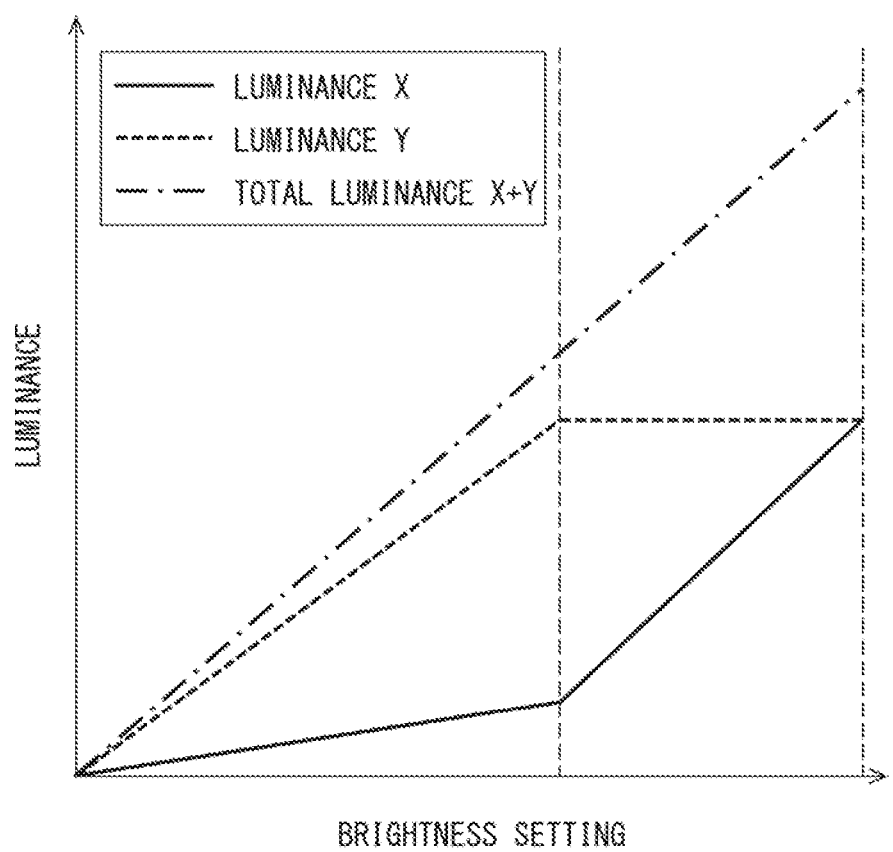
FIG. 6 is a diagram illustrating a relation between the brightness setting of the display screen, the luminance of the BL_A, the luminance of the BL_B, and the total luminance in the response speed emphasizing mode of the smartphone.

FIG. 6 illustrates a more detailed representation of the state illustrated in FIG. 5 in accordance with the actual specifications of the smartphone 100. In the case of the response speed emphasizing mode, a relation between the total luminance X+Y and the luminances X and Y is $X=Y\times\alpha$ ($\alpha<1$) when the brightness setting bar is on a dark setting, as illustrated in FIG. 6. When the brightness setting bar is on a bright setting, Y=a maximum luminance of Y and X=X+Y−(maximum luminance of Y).

In Embodiments 1 and 2, the above-described adjustment of the luminances X and Y by the light emission control section 13 is performed by adjusting a value of a current flowing through the BL_A 3 and a value of a current flowing through the BL_B 4 (to numeric values other than zero). In the case of the color reproducibility emphasizing mode, the current values are adjusted such that the value of the current flowing through the BL_A 3 becomes greater than the value of the current flowing through the BL_B 4. In the case of the response speed emphasizing mode, the current values are adjusted such that the value of the current flowing through the BL_A 3 becomes less than the value of the current flowing through the BL_B 4.

Further, "controlling the light emission of the BL_A 3 and the light emission of the BL_B 4" means that the light emission control section 13 causes the BL_A 3 and the BL_B 4 to emit light in a predetermined light emission pattern based on the light emission pattern signal for the BL_A 3 and the light emission pattern signal for the BL_B 4, both of which signals have been obtained from the light emission pattern generating section 12.

In a case where the obtained light emission pattern signals are light emission pattern signals corresponding to the color reproducibility emphasizing mode, the light emission control section 13 causes the BL_A 3 and the BL_B 4 to emit light so that the luminance X and the luminance Y are each fixed at High as illustrated in FIG. 3. In a case where the obtained light emission pattern signals are light emission pattern signals corresponding to the response speed emphasizing mode, the light emission control section 13 causes the BL_A 3 and the BL_B 4 to emit light so that each of the luminances X and Y has a PWM pulse waveform as illustrated in FIG. 5.

Details of Response Speed Emphasizing Mode

Generally, an electronic device, such as a smartphone, into which an LCD is incorporated prevents blurring of an image by causing a light emission pattern of a backlight of the LCD to correspond to a pulse waveform of PWM so that fluctuations of an image displayed on a display screen of the LCD are not visible. In order to prevent such fluctuations of the image from being visible, it backlight at a termination of one frame of image data where the display screen responses are relatively convergent.

However, in the conventional backlight in which the color reproducibility is secured to a certain degree, a response speed of the light emitting diode constituting the backlight is uniformly decreased. Thus, as illustrated in FIG. 7, pulsed light emission for the image data in the immediately preceding frame overlaps a liquid crystal response in the subsequent frame (see a two-dot chain line in FIG. 7).

In contrast, the backlight 2 in accordance with Embodiment 1 is provided with the BL_A 3 which emphasizes color reproducibility and the BL_B 4 which emphasizes a response speed. Then, in the response speed emphasizing mode which is turned on during the VR operation, the luminance X and the luminance Y are adjusted such that the relation between the luminance X of the BL_A 3 and the luminance Y of the BL_B 4 becomes $X=Y\times\alpha$ ($\alpha<1$).

Thus, in the case of attempting to achieve color reproducibility equivalent to that of the conventional backlight during the VR operation, the luminance of the BL_A 3 becomes lower than that of a light emitting diode of the conventional backlight. Therefore, light emission of the BL_A 3 converges in a shorter time than the conventional backlight (see "LUMINANCE OF BL_A" in FIG. 7). The BL_B 4 has higher luminance than the light emitting diode of the conventional backlight, but has a response speed faster than that of the light emitting diode of the conventional backlight. Thus, light emission of the BL_B 4 converges in a shorter time than the conventional backlight (see "LUMINANCE OF BL_B" in FIG. 7).

Figure 7:
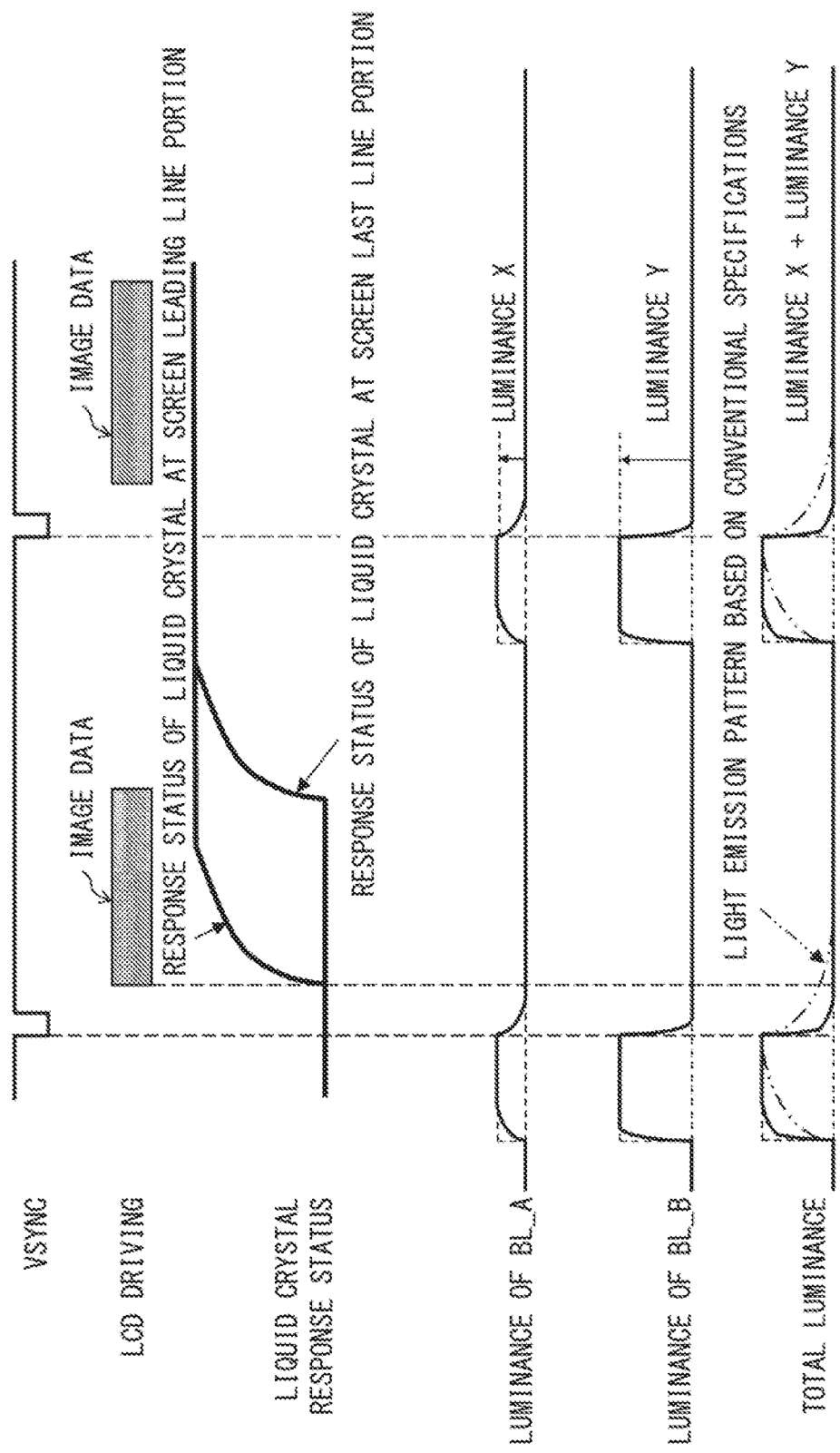
FIG. 7 is a diagram illustrating details of the relation between the luminance of the BL_A, the luminance of the BL_B, and the total luminance in the response speed emphasizing mode of the smartphone.

As a result, the total luminance X+Y also converges faster than the total luminance of the conventional backlight, and pulsed light emission for the image data in the immediately preceding frame does not overlap a liquid crystal response of the subsequent frame (see "TOTAL LUMINANCE" in FIG. 7). As described above, with use of the backlight 2 in accordance with Embodiment 1, it is possible to display an image with little blurring on the display screen of the LCD 1 even in a usage which emphasizes a response speed, for example, during the VR operation.

Method of Light Emission Control by Control Device

Figure 8:
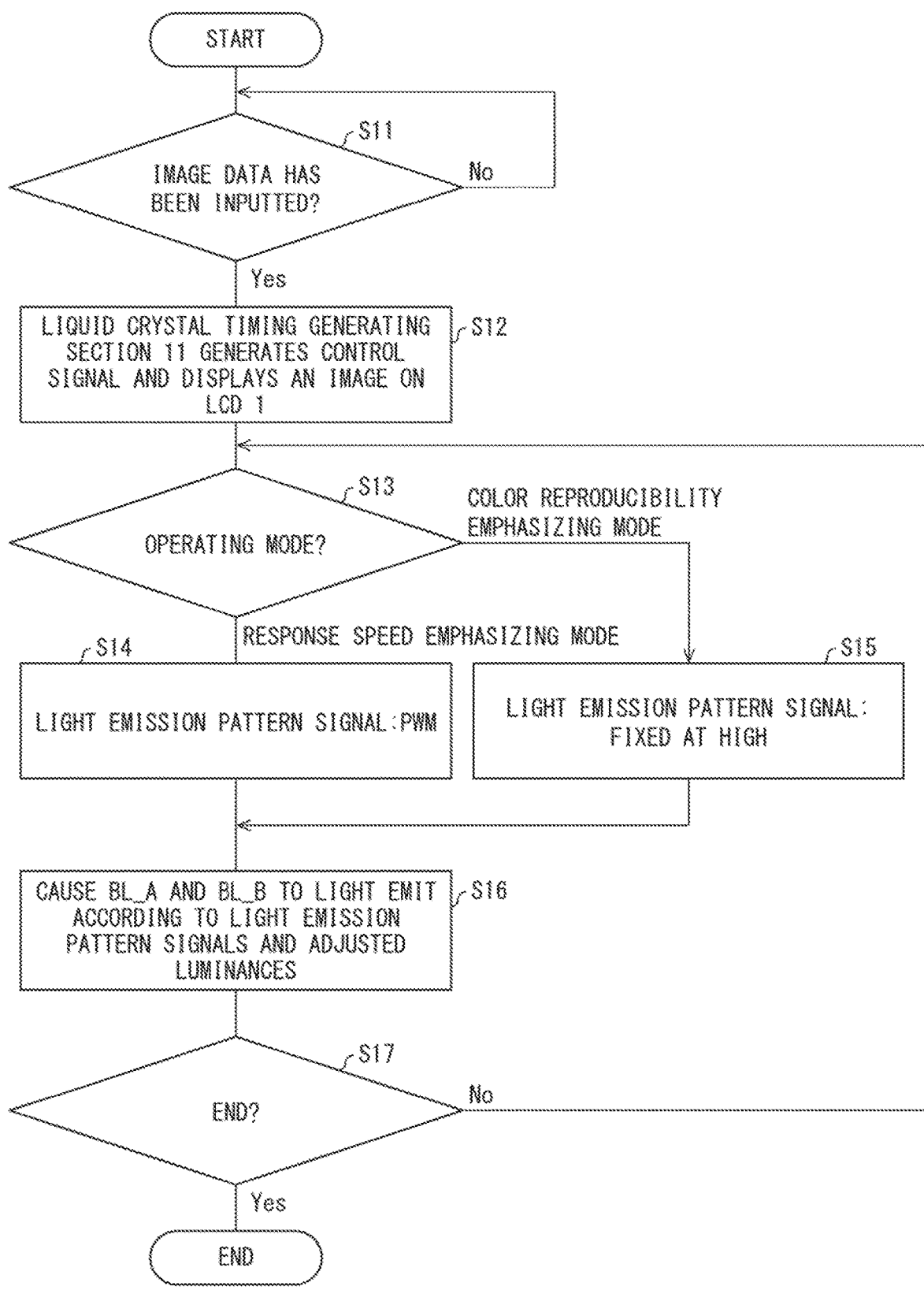
FIG. 8 is a flow chart showing how light emission is controlled by a control device in accordance with Embodiment 1 of the present invention.

A method of light emission control by the control device can be exemplified by a method illustrated in FIG. 8. As illustrated in FIG. 8, first, the liquid crystal timing generating section 11 determines whether image data has been inputted to the liquid crystal timing generating section 11 (step 11 (hereinafter abbreviated as "S11")). In a case of a "NO" (hereinafter abbreviated as "N") determination in S11, the liquid crystal timing generating section 11 carries out the processing of S11 again. In a case of a "YES" (hereinafter abbreviated as "Y") determination in S11, the process proceeds to S12.

In S12, the liquid crystal timing generating section 11 generates a control signal and displays an image on the LCD 1. In addition, the liquid crystal timing generating section 11 generates the operating mode signal for the BL_A 3 and the operating mode signal for the BL_B 4 and outputs the operating mode signals to the light emission pattern generating section 12. Next, in S13, the light emission pattern generating section 12 determines the operating mode of the smartphone 100 based on the obtained operating mode signals.

In a case where the light emission pattern generating section 12 determines in S13 that the operating mode is the response speed emphasizing mode, the light emission pattern generating section 12 generates a light emission pattern signals of the PWM pulse waveform and outputs the light emission pattern signals to the light emission control section 13 (S14). In a case where the light emission pattern generating section 12 determines in S13 that the operating mode is the color reproducibility emphasizing mode, the light emission pattern generating section 12 generates light emission pattern signals fixed at High, and outputs the generated light emission pattern signals to the light emission control section 13 (S15).

Next, in S16, the light emission control section 13 having obtained the light emission pattern signals of the PWM pulse waveform and the operating mode (response speed emphasizing mode) adjusts a value of the current to be flown through the BL_A 3 and a value of the current to be flown through the BL_B 4 such that the relation between the luminance X and the luminance Y becomes $X=Y\times\alpha$ ($\alpha<1$). Alternatively, the light emission control section 13 having obtained the light emission pattern signals fixed at High and the operating mode (color reproducibility emphasizing mode) adjusts a value of the current to be flown through the BL_A 3 and a value of the current to be flown through the BL_B 4 such that the relation between the luminance X and the luminance Y becomes $X=Y\times\alpha$ ($\alpha>1$). In this manner, the light emission control section 13 causes the BL_A 3 and the BL_B 4 to each emit light according to the light emission pattern signals and the adjusted luminances.

Next, in S17, a user determines whether to end the operation of the smartphone 100. In a case of "Y" determination in S17, the user powers off the smartphone 100 to end the operation of the smartphone 100. In a case of "N" determination in S17, the operation of the smartphone 100 further continues. In this case, the processing of S13 and the processing of each of the subsequent steps are carried out again.

Embodiment 2

Control of Light Emission Duration by Light Emission Control Section

In a smartphone 200 in accordance with Embodiment 2 illustrated in FIG. 1, a light emission control section 13 of a control device 20 controls a light emission period of the BL_B 4 such that the light emission period of the BL_4 is longer than a light emission period of the BL_A 3 when the VR application software is used. In this point, the smartphone 200 differs from the smartphone 100 in accordance with Embodiment 1.

Specifically, the light emission control section 13 of the control device 20 determines the usage of the smartphone 200 based on the operating mode signals obtained from the liquid crystal timing generating section 11 and the light emission pattern signals obtained from the light emission pattern generating section 12. In a case where the light emission control section 13 determines that the VR application software is used (response speed emphasizing mode), the light emission control section 13 adjusts a current-carrying period of the current flowing through the BL_B 4 such that the light emission period of the BL_B 4 becomes longer than the light emission period of the BL_A 3.

Effect of Control of Light Emission Period by Light Emission Control Section In a case where the VR application software is used (response speed emphasizing mode), the BL_A 3 and the BL_B4 are pulse-driven. In such a case, a mean luminance of the entire display screen of the LCD 1 is lower, as compared to a case where the BL_A3 and the BL_B 4 each emit light at all times as inn normal use (color reproducibility emphasizing mode) of the smartphone 200.

Figure 9:
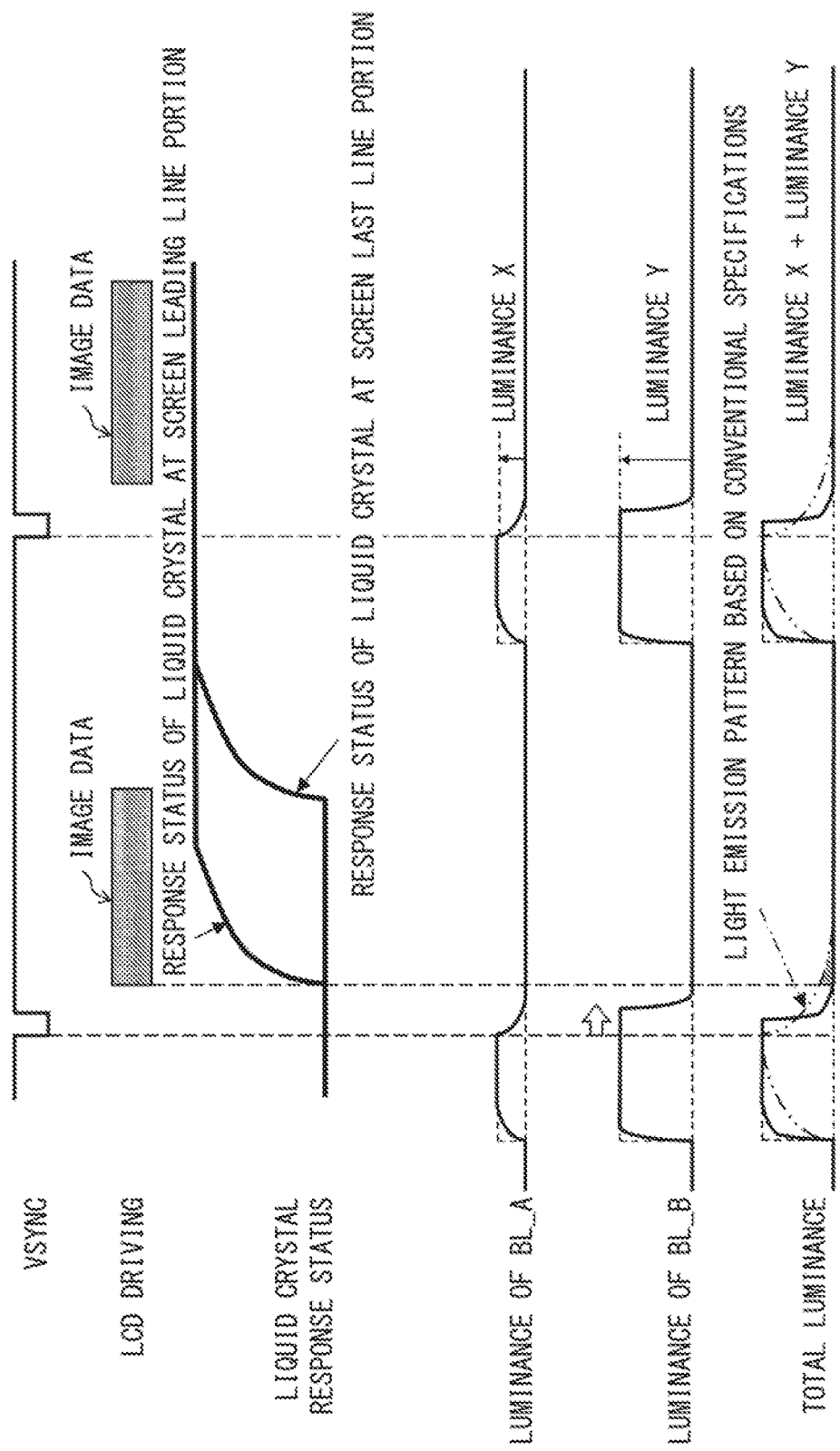
FIG. 9 is a diagram illustrating details of a relation between the luminance of BL_A, the luminance of BL_B, and a total luminance in the response speed emphasizing mode of a smartphone in accordance with Embodiment 2 of the present invention.

In this regard, the light emission control section 13 of the control device 20, as illustrated in FIG. 9, makes the light emission period of the BL_B 4 longer than the light emission period of BL_A in the response speed emphasizing mode (see "LUMINANCE OF BL_A" and "LUMINANCE OF BL_B" in FIG. 9). This increases the light emission period of the entire backlight 2, thereby increasing the total luminance X+Y (see "TOTAL LUMINANCE" in FIG. 9).

The response speed of the BL_B 4 is faster than that of the BL_A 3. Therefore, even when the light emission period of the BL_B 4 is made longer than the light emission period of the BL_A 3, pulsed light emission for image data in the immediately preceding frame converges before a liquid crystal response in the subsequent frame (see "TOTAL LUMINANCE" in FIG. 9). Therefore, according to the control device 20, it is possible to prevent display blur while further increasing the mean luminance of the entire display screen of the LCD 1.

A case subject to the above-described control of the light emission period by the light emission control section 13 of the control device 20 is not limited to a case where the VR application software is used. In other words, the light emission control section 13 can control the light emission period of the BL_B 4 such that the light emission period of the BL_B 4 is longer than the light emission period of the BL_A 3 in a case where the smartphone 200 is used in a situation such that the luminance X of the BL_A 3 is preferably lower than the luminance Y of the BL_B 4.

Embodiment 3

Outline of Smartphone

Figure 10:
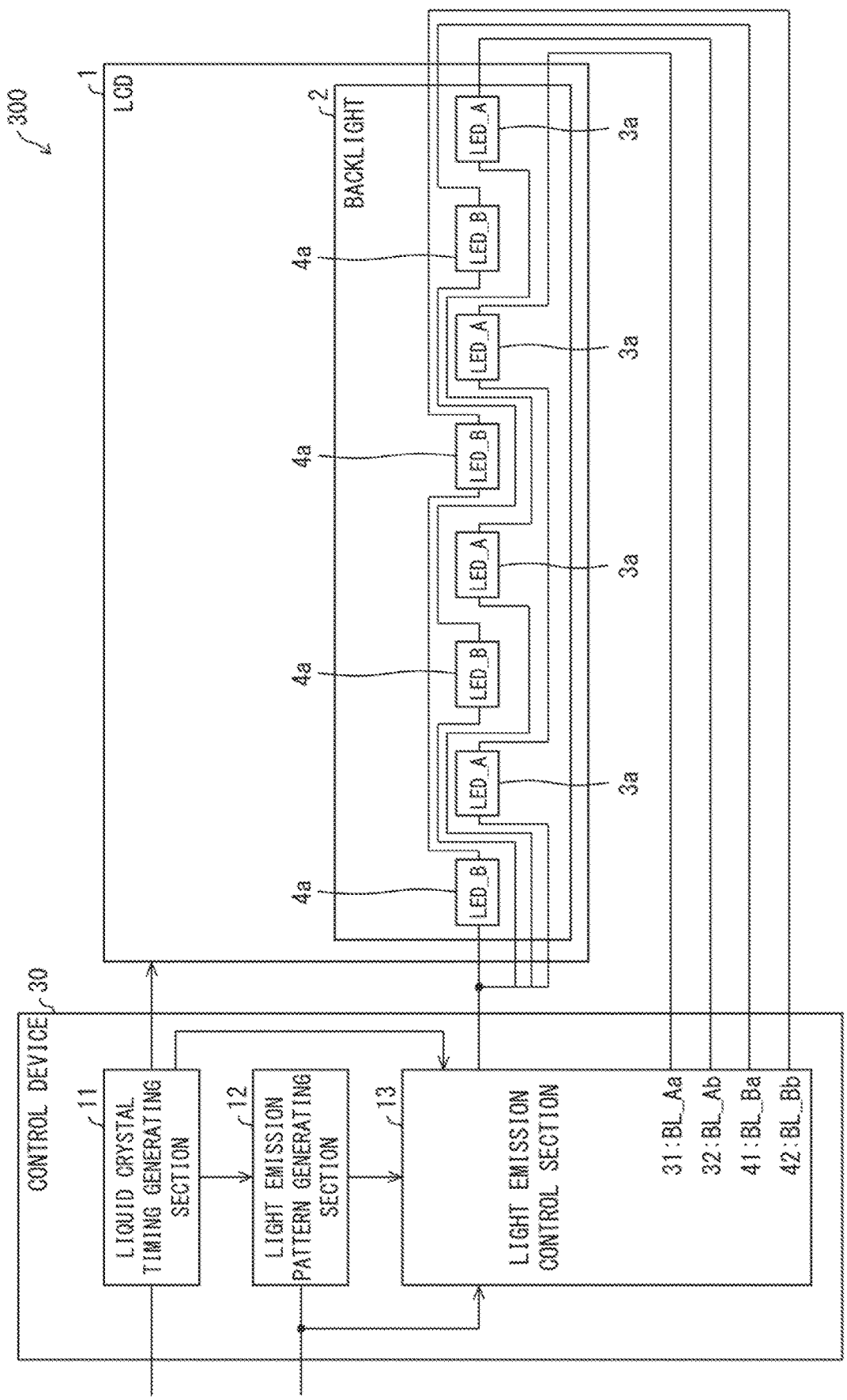
FIG. 10 is a block diagram illustrating a functional configuration of a control device in accordance with Embodiment 3 of the present invention.

In a smartphone 300 in accordance with Embodiment 3, a BL_Aa 31 (first light emitting device), a BL_Ab 32 (first light emitting device), a BL_Ba 41 (second light emitting device), and a BL_Bb 42 (second light emitting device) are arranged in a backlight 2 of a LCD 1, as illustrated in FIG. 10. In this point, the smartphone 300 differs from the smartphone 100 in accordance with Embodiment 1 and the smartphone 200 in accordance with Embodiment 2.

A light emission control section 13 of a control device 30 causes at least one of the BL_Aa 31, the BL_Ab 32, the BL_Ba 41, and the BL_Bb 42 to emit light according to the usage of the smartphone 300. In this point, the control device 30 differs from the control device 10 in accordance with Embodiment 1 and the control device 20 in accordance with Embodiment 2.

(LCD)

As illustrated in FIG. 10, in the backlight 2 of the LCD 1, the BL_Aa 31 and the BL_Ab 32 are each configured such that two LEDs_A 3a are connected in series. In addition, the BL_Ba 41 and the BL_Bb 42 are each configured such that two LEDs_B 4a are connected in series.

The LEDs_A 3a of the BL_Aa 31 and the LEDs_A 3a of the BL_Ab 32 are alternately arranged in the backlight 2. The LEDs_B 4a of the BL_Ba 41 and the LEDs_B 4a of the BL_Bb 42 are alternately arranged in the backlight 2. Further, the LEDs_A 3a of the BL_Aa 31 and the LEDs_A 3a of the BL_Ab 32 are arranged so as to be adjacent to the LEDs_B 4a of the BL_Ba 41 and the LEDs_B 4a of the BL_Bb 42, respectively.

With the above-described arrangement and with, for example, an arrangement of a sheet having a high light diffusivity between the backlight 2 and the display screen for increased uniformity of the luminance of the entire backlight 2, the entire surface of the display screen can be substantially uniformly lit even when the count of light emission of the BL_Aa 31, the BL_Ab 32, the BL_Ba 41, and the BL_Bb 42 are finely controlled. This makes it possible to effectively prevent lighting unevenness.

(Light Emission Control Section)

Like the light emission control section 13 of the control device 20, the light emission control section 13 of the control device 30 determines the usage of the smartphone 300 based on the operating mode signals obtained from the liquid crystal timing generating section 11 and the light emission pattern signals obtained from the light emission pattern generating section 12.

In a case where the light emission control section 13 determines that the smartphone 300 is in normal use (color reproducibility emphasizing mode), the light emission control section 13 causes, for example, the BL_Aa 31, the BL_Ab 32, and the BL_Ba 41 to emit light. However, the light emission control section 13 does not cause the BL_Bb 42 to emit light. In a case where the light emission control section 13 determines that the VR application software is used (response speed emphasizing mode), the light emission control section 13 causes, for example, the BL_Aa 31, the BL_Ba 41, and the BL_Bb 42 to emit light. However, the light emission control section 13 does not cause the BL_Ab 32 to emit light.

As described above, the light emission control section 13 of the control device 30 controls light emission/no light emission (state in which no light is emitted) of the BL_Aa 31, the BL_Ab 32, the BL_Ba 41, and the BL_Bb 42, rather than adjusting the levels of the luminances X and Y after causing all of the BL_A 3 and the BL_B 4 to emit light as in Embodiments 1 and 2.

Note that a manner of light emission/no-light emission of the BL_Aa 31, the BL_Ab 32, the BL_Ba 41, and the BL_Bb 42 is not limited to the above manner. For example, in the color reproducibility emphasizing mode, the BL_Ba 41 may be caused to emit no light, or both the BL_Ba 41 and the BL_Bb 42 may be caused to emit no light. For example, in the response speed emphasizing mode, the BL_Aa 31 may be caused to emit no light, or both the BL_Aa 31 and the BL_Ab 32 may be caused to emit no light.

Software Implementation Example

Control blocks of the control devices 10, 20, and 30 (particularly, the light emission control section 13) can be realized by a logic circuit (hardware) provided in an integrated circuit (IC chip) or the like or can be alternatively realized by software.

In the latter case, the control devices 10, 20, and 30 each include a computer that executes instructions of a program that is software realizing the foregoing functions. The computer, for example, includes at least one processor (control device) and at least one computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Recap

A control device (10, 20, 30) in accordance with a first aspect of the present invention is a control device for controlling an electronic device (smartphone 100, 200, 300), the electronic device including: at least one first light emitting device (BL_A 3); and at least one second light emitting device (BL_B 4) having color reproducibility lower than that of the first light emitting device and having a response speed faster than that of the first light emitting device, the control device including: a light emission control section (13) configured to control light emission of the first light emitting device and light emission of the second light emitting device according to a usage of the electronic device such that a relation between luminance (X) of the first light emitting device and luminance (Y) of the second light emitting device satisfies a predetermined condition.

According to the above configuration, the control device can appropriately adjust the luminance of the first light emitting device and the luminance of the second light emitting device by controlling the light emission of the first light emitting device and the light emission of the second light emitting device according to the usage of the electronic device. Thus, for example, in a case where the electronic device is in normal use, light emission of the first light emitting device and light emission of the second light emitting device can be controlled, with emphasis on color reproducibility, such that the luminance of the first light emitting device is higher than the luminance of the second light emitting device. This enables an image displayed on the display screen to have colors more vivid than actual colors of a real-world object (hereinafter expressed as "desirable color reproduction"), while ensuring a desired luminance.

For example, in a case where the virtual reality (VR) application software is used, light emission of the first light emitting device and light emission of the second light emitting device can be controlled, with emphasis on a response speed, such that the luminance of the second light emitting device is higher than the luminance of the first light emitting device. This makes it possible to display a moving image with less afterimage, so that the image quality of the moving image can be improved.

Thus, the control device allows the first light emitting device and the second light emitting device as a whole to achieve either desirable color reproduction or improved image quality of a moving image according to the usage of the electronic device.

In a second aspect of the present invention, the control device (10, 20) can be arranged such that, in the first aspect of the present invention, the light emission control section performs the control by adjusting a value of a current flowing through the first light emitting device and a value of a current flowing through the second light emitting device to numeric values other than zero.

According to the above configuration, the control device can appropriately adjust the luminance of the first light emitting device and the luminance of the second light emitting device by controlling a value of a current flowing through the first light emitting device and a value of a current flowing through the second light emitting device according to the usage of the electronic device. Therefore, for example, by appropriately setting a predetermined condition, the control device allows the first light emitting device and the second light emitting device as a whole to either desirable color reproduction or improved image quality of a moving image, while reducing the occurrence of luminance unevenness.

In a third aspect of the present invention, the control device (20) can be arranged such that, in the first or second aspect of the present invention, in a case where the electronic device (smartphone 200) is operated for a usage in which the predetermined condition is a condition such that the luminance of the first light emitting device is lower than that of the second light emitting device, the light emission control section controls a light emission period of the second light emitting device such that the light emission period of the second light emitting device is longer than that of the first light emitting device.

Generally, in the case of a screen display mode in which a response speed is emphasized for a light emitting device such as a backlight, the light emitting device emits light by pulse driving, and consequently, a mean luminance of the entire display screen is lower than that in the case of a normal screen display mode.

In this regard, according to the above configuration, the control device can make the light emission period of the second light emitting device longer than that of the first light emitting device, for example, when the electronic device is operated in a usage that emphasizes a response speed. Thus, the control device allows the first light emitting device and the second light emitting device as a whole to further increase the luminance while achieving improved image quality of a moving image.

In a fourth aspect of the present invention, the control device (10, 20, 30) can be arranged such that, in any one of the first to third aspects of the present invention, the first light emitting device includes a plurality of first light emitting elements (LED_A 3a), the second light emitting device includes a plurality of second light emitting elements (LED_B 4a) each having color reproducibility lower than that of each of the first light emitting elements and having a response speed faster than that of each of the first light emitting elements, in the electronic device (smartphone 100, 200, 300), the first light emitting elements and the second light emitting elements are arranged so as to be adjacent to each other, the light emission control section controls light emission of each of the first light emitting elements and light emission of each of the second light emitting elements.

According to the above configuration, in the electronic device, the first light emitting elements and the second light emitting elements are arranged so as to be adjacent to each other. Thus, for example, as compared with the case where the plurality of first light emitting elements and the plurality of second light emitting elements are each arranged in a line, and the plurality of first light emitting device and second light emitting device are arranged in parallel, the entire display screen can be lit more evenly regardless of how the light emission control section perform light emission control.

Thus, the control device allows the first light emitting device and the second light emitting device as a whole to effectively prevent lighting unevenness of the display screen while achieving either desirable color reproduction or improved image quality of a moving image.

In a fifth aspect of the present invention, the control device can be arranged such that, in the fourth aspect of the present invention, the first light emitting elements and the second light emitting elements are light emitting diodes, and the first light emitting device and the second light emitting device constitute at least a portion of a backlight (2) contained in the electronic device.

According to the above-described configuration, the control device allows the LED backlight as a whole to achieve either desirable color reproduction or improved image quality of a moving image according to the usage of the electronic device.

An electronic device (smartphone 100, 200, 300) in accordance with a sixth aspect of the present invention is an electronic device including: at least one first light emitting device (BL_A 3); at least one second light emitting device (BL_B 4); and at least one control device (10, 20, 30), the second light emitting device having color reproducibility lower than that of the first light emitting device and having a response speed faster than that of the first light emitting device, the control device carrying out light emission control processing of controlling light emission of the first light emitting device and light emission of the second light emitting device according to a usage of the electronic device such that a relation between luminance (X) of the first light emitting device and luminance (Y) of the second light emitting device satisfies a predetermined condition.

According to the above configuration, it is possible to provide an electronic device including the first and second light emitting devices which can achieve either desirable color reproduction or improved image quality of a moving image according to the usage of the electronic device.

A control method in accordance with a seventh aspect of the present invention is a control method by which a control device controls an electronic device, the electronic device (smartphone 100, 200, 300) including: at least one first light emitting device (BL_A 3); and at least one second light emitting device (BL_B 4) having color reproducibility lower than that of the first light emitting device and having a response speed faster than that of the first light emitting device, the control method including: a light emission control step of controlling light emission of the first light emitting device and light emission of the second light emitting device according to a usage of the electronic device such that a relation between luminance (X) of the first light emitting device and luminance (Y) of the second light emitting device satisfies a predetermined condition.

According to the above-described configuration, it is possible to provide a control method, performed by the control device, for allowing the first and second light emitting devices as a whole to achieve either desirable color reproduction or improved image quality of a moving image according to the usage of the electronic device.

A control device in accordance with the foregoing aspects of the present invention can be realized in the form of a computer. In such a case, the present invention encompasses: a program for the control device which causes a comp to operate as each of the sections (software elements) of the control device so that the control device can be realized in the form of a computer; and a computer-readable storage medium storing the program therein.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

2 Backlight
3 BL_A (first light emitting device
3a LED_A (first light emitting device, light emitting diode)
4 BL_B (second light emitting device)
4a LED_B (second light emitting device, light emitting diode)
10, 20, 30 Control device
31 BL_Aa (first light emitting device)
32 BL_Ab (first light emitting device)
41 BL_Ba (second light emitting device)
42 BL_Bb (second light emitting device)
13 Light emission control section
100, 200, 300 Smartphone
C1, C2 Color reproducibility
X, Y Luminance

The invention claimed is:

1. A control device for controlling an electronic device, the electronic device comprising: at least one first light emitting device; and at least one second light emitting device having color reproducibility lower than that of the first light emitting device and having a response speed faster than that of the first light emitting device, the control device comprising:
a light emission control section configured to control light emission of the first light emitting device with a signal fixed at High and light emission of the second light emitting device with a PWM signal according to a usage of the electronic device.

2. The control device according to claim 1, wherein:
the light emission control section performs the control by adjusting a value of a current flowing through the first light emitting device and a value of a current flowing through the second light emitting device to numeric values other than zero.

3. The control device according to claim 1, wherein:
the first light emitting device includes a plurality of first light emitting elements,
the second light emitting device includes a plurality of second light emitting elements each having color reproducibility lower than that of each of the first light emitting elements and having a response speed faster than that of each of the first light emitting elements,
in the electronic device, the first light emitting elements and the second light emitting elements are arranged so as to be adjacent to each other,
the light emission control section controls light emission of each of the first light emitting elements and light emission of each of the second light emitting elements.

4. A control device for controlling an electronic device, the electronic device comprising: at least one first light emitting device; and at least one second light emitting device having color reproducibility lower than that of the first light emitting device and having a response speed faster than that of the first light emitting device, the control device comprising:
a light emission control section configured to control light emission of the first light emitting device and light emission of the second light emitting device according to a usage of the electronic device such that a relation between luminance of the first light emitting device and luminance of the second light emitting device satisfies a predetermined condition, wherein:
in a case where the electronic device is operated for a usage in which the predetermined condition is a condition such that the luminance of the first light emitting device is lower than that of the second light emitting device, the light emission control section controls a light emission period of the second light emitting device such that the light emission period of the second light emitting device is longer than that of the first light emitting device.

5. A control device for controlling an electronic device, the electronic device comprising: at least one first light emitting device; and at least one second light emitting device having color reproducibility lower than that of the first light emitting device and having a response speed faster than that of the first light emitting device, the control device comprising:

a light emission control section configured to control light emission of the first light emitting device and light emission of the second light emitting device according to a usage of the electronic device such that a relation between luminance of the first light emitting device and luminance of the second light emitting device satisfies a predetermined condition, wherein:

the first light emitting device includes a plurality of first light emitting elements, the second light emitting device includes a plurality of second light emitting elements, the plurality of first light emitting elements and the plurality of second light emitting elements are light emitting diodes, and the first light emitting device and the second light emitting device constitute at least a portion of a backlight contained in the electronic device.

6. An electronic device comprising:
at least one control device according to claim 1.

* * * * *